(12) United States Patent
Raz et al.

(10) Patent No.: US 7,606,924 B2
(45) Date of Patent: Oct. 20, 2009

(54) METHOD AND APPARATUS FOR DETERMINING THE ORDER OF STREAMING MODULES

(75) Inventors: Uri Raz, Fairlawn, NJ (US); Yehuda Volk, Tel-Aviv (IL); Shmuel Melamed, Ramat-Gan (IL)

(73) Assignee: Symantec Corporation, Mountain View, CA (US)

( * ) Notice: Subject to any disclaimer, the term of this patent is extended or adjusted under 35 U.S.C. 154(b) by 697 days.

(21) Appl. No.: 10/354,947

(22) Filed: Jan. 30, 2003
(Under 37 CFR 1.47)

(65) Prior Publication Data
US 2003/0140160 A1      Jul. 24, 2003

Related U.S. Application Data

(63) Continuation of application No. 09/745,646, filed on Dec. 22, 2000, now abandoned, and a continuation-in-part of application No. 09/120,575, filed on Jul. 22, 1998, now Pat. No. 6,311,221.

(60) Provisional application No. 60/177,736, filed on Jan. 21, 2000.

(51) Int. Cl.
*G06F 15/16* (2006.01)
*G06F 9/00* (2006.01)

(52) U.S. Cl. .................... 709/231; 719/315; 719/329

(58) Field of Classification Search .............. 719/329, 719/315; 709/231; 715/526
See application file for complete search history.

(56) References Cited

U.S. PATENT DOCUMENTS

| | | | |
|---|---|---|---|
| 5,163,131 A | 11/1992 | Row et al. | |
| 5,237,460 A | 8/1993 | Miller et al. | |
| 5,394,534 A | 2/1995 | Kulakowski et al. | |
| 5,487,167 A | 1/1996 | Dinallo et al. | |
| 5,495,610 A | 2/1996 | Shing et al. | |
| 5,504,886 A | 4/1996 | Chang et al. | |
| 5,581,706 A | 12/1996 | Jessup, Jr. et al. | |
| 5,581,764 A | 12/1996 | Fitzgerald et al. | |
| 5,668,948 A | 9/1997 | Belknap et al. | |
| 5,708,796 A | 1/1998 | Ozden et al. | |
| 5,712,976 A | 1/1998 | Falcon, Jr. et al. | |
| 5,742,768 A | 4/1998 | Gennaro et al. | |

(Continued)

FOREIGN PATENT DOCUMENTS

EP          0 690 400 A2      1/1996

(Continued)

OTHER PUBLICATIONS

Alok Sinha, "Client-Server Computing", Communications of the ACM, Jul. 1992, vol. 35, No. 7, pp. 77-98.

(Continued)

*Primary Examiner*—Li B Zhen
(74) *Attorney, Agent, or Firm*—Meyertons, Hood, Kivlin, Kowert & Goetzel, P.C.

(57) ABSTRACT

A method for determining an order in which to stream modules of an application from a server to a client, where the application uses modules in an execution-time dependent order, employs a predictive model to determine which module transitions are most likely to occur in the future in view of the clients present state in the application and then stream the modules to the client in the determined order. Different sets of transition weights can be used for clients falling into different categories, such as time of application use and age of the user at the client. Additional factors which can be used to select the order to stream the modules include cache utilization at the client and customized streaming orders specified by the user.

20 Claims, 12 Drawing Sheets

400

U.S. PATENT DOCUMENTS

| | | | |
|---|---|---|---|
| 5,745,380 A | 4/1998 | Sandvoss et al. | |
| 5,752,005 A | 5/1998 | Jones | |
| 5,754,774 A | 5/1998 | Bittinger et al. | |
| 5,761,477 A | 6/1998 | Wahbe et al. | |
| 5,764,235 A | 6/1998 | Hunt et al. | |
| 5,765,164 A | 6/1998 | Prasad et al. | |
| 5,768,528 A | 6/1998 | Stumm | |
| 5,787,284 A | 7/1998 | Blainey et al. | |
| 5,802,292 A | 9/1998 | Mogul | |
| 5,809,247 A * | 9/1998 | Richardson et al. | 709/218 |
| 5,835,749 A | 11/1998 | Cobb | |
| 5,864,870 A | 1/1999 | Guck | |
| 5,878,223 A | 3/1999 | Becker et al. | |
| 5,892,915 A | 4/1999 | Duso et al. | |
| 5,894,479 A | 4/1999 | Mohammed | |
| 5,911,776 A | 6/1999 | Guck | |
| 5,919,247 A | 7/1999 | Van Hoff et al. | |
| 5,925,100 A * | 7/1999 | Drewry et al. | 709/219 |
| 5,933,644 A | 8/1999 | Wallace | |
| 5,946,697 A | 8/1999 | Shen | |
| 5,956,485 A | 9/1999 | Perlman | |
| 5,956,509 A | 9/1999 | Kevner | |
| 5,958,051 A | 9/1999 | Renaud et al. | |
| 5,966,702 A | 10/1999 | Fresko et al. | |
| 5,974,129 A | 10/1999 | Bodnar | |
| 5,978,788 A | 11/1999 | Castelli et al. | |
| 5,978,791 A | 11/1999 | Farber et al. | |
| 5,987,513 A | 11/1999 | Prithviraj et al. | |
| 5,991,776 A | 11/1999 | Bennett et al. | |
| 6,003,087 A | 12/1999 | Housel, III et al. | |
| 6,006,265 A | 12/1999 | Rangan et al. | |
| 6,009,410 A | 12/1999 | LeMole et al. | |
| 6,009,429 A * | 12/1999 | Greer et al. | 707/10 |
| 6,012,071 A | 1/2000 | Krishna et al. | |
| 6,023,726 A | 2/2000 | Saksena | |
| 6,029,045 A | 2/2000 | Picco et al. | |
| 6,044,382 A | 3/2000 | Martino | |
| 6,044,403 A | 3/2000 | Gerszberg et al. | |
| 6,047,323 A | 4/2000 | Krause | |
| 6,058,387 A | 5/2000 | Campbell et al. | |
| 6,065,046 A | 5/2000 | Feinberg et al. | |
| 6,073,129 A | 6/2000 | Levine et al. | |
| 6,085,193 A | 7/2000 | Malkin et al. | |
| 6,085,226 A * | 7/2000 | Horvitz | 709/203 |
| 6,088,524 A | 7/2000 | Levy et al. | |
| 6,101,495 A | 8/2000 | Tsuchida et al. | |
| 6,102,287 A | 8/2000 | Matyas, Jr. | |
| 6,108,703 A | 8/2000 | Leighton et al. | |
| 6,119,082 A | 9/2000 | Zinser, Jr. et al. | |
| 6,122,628 A | 9/2000 | Castelli et al. | |
| 6,128,653 A | 10/2000 | del Val et al. | |
| 6,139,197 A | 10/2000 | Banks | |
| 6,144,960 A | 11/2000 | Okada et al. | |
| 6,148,340 A | 11/2000 | Bittinger et al. | |
| 6,163,805 A | 12/2000 | Silva et al. | |
| 6,170,008 B1 | 1/2001 | Bahlmann et al. | |
| 6,173,291 B1 | 1/2001 | Jenevein | |
| 6,173,327 B1 | 1/2001 | De Borst et al. | |
| 6,195,622 B1 * | 2/2001 | Altschuler et al. | 703/2 |
| 6,199,082 B1 | 3/2001 | Ferrel et al. | |
| 6,199,095 B1 | 3/2001 | Robinson | |
| 6,205,481 B1 | 3/2001 | Heddaya et al. | |
| 6,219,671 B1 | 4/2001 | de Vries et al. | |
| 6,230,184 B1 | 5/2001 | White et al. | |
| 6,253,289 B1 * | 6/2001 | Bates et al. | 711/137 |
| 6,256,623 B1 | 7/2001 | Jones | |
| 6,256,635 B1 | 7/2001 | Arrouye et al. | |
| 6,272,598 B1 | 8/2001 | Arlitt et al. | |
| 6,282,711 B1 | 8/2001 | Halpern et al. | |
| 6,286,003 B1 | 9/2001 | Muta | |
| 6,289,334 B1 | 9/2001 | Reiner et al. | |
| 6,311,221 B1 | 10/2001 | Raz et al. | |
| 6,357,042 B2 | 3/2002 | Srinivasan et al. | |
| 6,370,573 B1 | 4/2002 | Bowman-Amuah | |
| 6,374,402 B1 | 4/2002 | Schmeidler et al. | |
| 6,381,742 B2 | 4/2002 | Forbes et al. | |
| 6,385,644 B1 | 5/2002 | Devine et al. | |
| 6,393,526 B1 | 5/2002 | Crow et al. | |
| 6,408,294 B1 | 6/2002 | Getchius et al. | |
| 6,412,004 B1 | 6/2002 | Chen et al. | |
| 6,421,777 B1 | 7/2002 | Pierre-Louis et al. | |
| 6,425,125 B1 | 7/2002 | Fries et al. | |
| 6,427,149 B1 | 7/2002 | Rodriguez et al. | |
| 6,438,630 B1 | 8/2002 | DeMoney | |
| 6,453,334 B1 | 9/2002 | Vinson et al. | |
| 6,453,354 B1 | 9/2002 | Jiang et al. | |
| 6,463,508 B1 | 10/2002 | Wolf et al. | |
| 6,466,980 B1 | 10/2002 | Lumelsky et al. | |
| 6,484,311 B2 | 11/2002 | Sobeski et al. | |
| 6,493,434 B1 | 12/2002 | Desmond et al. | |
| 6,499,060 B1 | 12/2002 | Wang et al. | |
| 6,523,027 B1 | 2/2003 | Underwood | |
| 6,535,894 B1 | 3/2003 | Schmidt et al. | |
| 6,538,991 B1 | 3/2003 | Kodialam et al. | |
| 6,546,554 B1 | 4/2003 | Schmidt et al. | |
| 6,572,662 B2 * | 6/2003 | Manohar et al. | 715/526 |
| 6,574,618 B2 | 6/2003 | Eylon et al. | |
| 6,587,127 B1 | 7/2003 | Leeke et al. | |
| 6,604,106 B1 | 8/2003 | Bodin et al. | |
| 6,604,144 B1 * | 8/2003 | Anders | 709/231 |
| 6,615,258 B1 | 9/2003 | Barry et al. | |
| 6,622,168 B1 | 9/2003 | Datta | |
| 6,622,199 B1 | 9/2003 | Spall et al. | |
| 6,625,581 B1 | 9/2003 | Perkowski | |
| 6,631,425 B1 * | 10/2003 | Helland et al. | 719/332 |
| 6,633,898 B1 | 10/2003 | Seguchi et al. | |
| 6,643,650 B1 | 11/2003 | Slaughter et al. | |
| 6,748,525 B1 | 6/2004 | Hubacher et al. | |
| 6,757,894 B2 | 6/2004 | Eylon et al. | |
| 6,763,370 B1 | 7/2004 | Schmeidler et al. | |
| 6,789,252 B1 | 9/2004 | Burke et al. | |
| 6,799,197 B1 | 9/2004 | Shetty et al. | |
| 6,810,478 B1 | 10/2004 | Anand et al. | |
| 6,813,769 B1 * | 11/2004 | Limprecht et al. | 719/315 |
| 6,839,765 B1 | 1/2005 | Sato | |
| 6,845,098 B1 | 1/2005 | Strahs | |
| 6,959,318 B1 * | 10/2005 | Tso | 709/203 |
| 2001/0034736 A1 | 10/2001 | Eylon et al. | |
| 2001/0037399 A1 | 11/2001 | Eylon et al. | |
| 2001/0037400 A1 | 11/2001 | Raz et al. | |
| 2001/0044850 A1 | 11/2001 | Raz et al. | |
| 2002/0009538 A1 | 1/2002 | Arai | |
| 2002/0042833 A1 | 4/2002 | Hendler et al. | |
| 2002/0083183 A1 | 6/2002 | Pujare et al. | |
| 2002/0087717 A1 | 7/2002 | Artzi et al. | |
| 2002/0087883 A1 | 7/2002 | Wohlgemuth et al. | |
| 2002/0087963 A1 | 7/2002 | Eylon et al. | |
| 2002/0091763 A1 | 7/2002 | Shah et al. | |
| 2002/0138640 A1 | 9/2002 | Raz et al. | |
| 2002/0157089 A1 | 10/2002 | Patel et al. | |
| 2002/0161908 A1 | 10/2002 | Benitez et al. | |
| 2003/0004882 A1 | 1/2003 | Holler et al. | |
| 2003/0009538 A1 | 1/2003 | Shah et al. | |
| 2003/0056112 A1 | 3/2003 | Vinson et al. | |
| 2003/0140160 A1 | 7/2003 | Raz et al. | |
| 2004/0143586 A1 | 7/2004 | Chung | |
| 2004/0165007 A1 | 8/2004 | Shafron | |
| 2004/0230971 A1 | 11/2004 | Rachman et al. | |
| 2006/0053228 A1 | 3/2006 | Rachman et al. | |

FOREIGN PATENT DOCUMENTS

| | | |
|---|---|---|
| EP | 0 780 778 A2 | 6/1997 |
| EP | 0 817 031 A2 | 1/1998 |

| | | |
|---|---|---|
| WO | WO 97/46955 A1 | 12/1997 |
| WO | WO 99/07007 A2 | 2/1999 |
| WO | WO 00/05637 | 2/2000 |
| WO | WO 00/46685 A1 | 8/2000 |
| WO | WO 00/62161 A2 | 10/2000 |
| WO | WO 01/53940 A2 | 7/2001 |
| WO | WO 02/01350 A1 | 1/2002 |

OTHER PUBLICATIONS

Nevzat Hurkan Balkir, et al., "Delivering Presentations from Multimedia Servers", The VLDB Journal, 1998, pp. 294-307.

International Search Report dated Aug. 6, 2001 for PCT/US01/01501, 4 pgs.

International Search Report dated Oct. 12, 2001 for PCT/US01/01596, 3 pgs.

International Search Report dated Nov. 6, 2001 for PCT/US01/30006, 3 pgs.

International Search Report dated Nov. 1, 2001 for PCT/US01/30007, 3 pgs.

International Search Report dated Jun. 20, 2000 for PCT/US00/02190, 4 pgs.

International Search Report dated Apr. 13, 2000 for PCT/US99/16055, 4 pgs.

Cuneyt Akinlar et al., "A Scalable Distributed Multimedia File System Using Network Attached Autonomous Disks", 2000 IEEE, pp. 180-187.

Graham Glass, "A Universal Streaming Service", C++ Report, Apr. 1996, pp. 74-76 and 81-83.

Red Brick Warehouse Family: White Papers and PDF's, "Aggregate Computation and Management", http://www.informix.com/informix/solutions/dw/redbrick/wp.../redbrickvistawhitepapaer.htm, Oct. 4, 2000, 10 pages.

S.-H. Gary Chan, et al., "Caching Schemes for Distributed Video Services", 1999 IEEE, pp. 994-999.

"Connected, Limited Device Configuration: Specification Version 1.0, Java 2 Platform Micro Edition", Sun Microsystems, May 19, 2000.

Julie Basu, et al., "Degress of Transaction Isolation in SQL Cache: A Predicate-Based Client-Side Chaching System", May 15, 1996, pp. 1-22.

Menta Software, "Delivering Windows to the Net: White Paper", 2000, 19 pages.

Junehwa Song et al., "Design Alternatives for Scalable Web Server Accelerators", IEEE International Symposium on Performance Analysis of Systems and Software, 2000, pp. 1-20.

"Distributed Systems: Concepts and Design", Second Edition, 1994, pp. 69-72 and 99-101.

Stream Theory, "First there was Streaming Audio, then Streaming Video. Now get ready for Streaming Software",2000, 22 pages.

Alan Jones et al., "Handling Audio and Video Streams in a Distributed Environment",1993, pp. 231-243.

BoostWorks, BoostWeb v3 Optimizer, Technology Overview, "How it Works", Sep. 27, 2000, 24 pages.

"Java 2 Platform Micro Edition (J2ME) Technology for Creating Mobile Devices", White Paper, Sun Microsystems, May 19, 2000, pp. i-36.

"Java Media Framework API Guide", Nov. 19, 1999, JMF 2.0 FCS, pp. 1-71.

Tim Ritchey, "Java!", New Riders Publishing, pp. i, ii, 1995, p. 214-216.

"Microsoft Press Computer Dictionary", Third Edition, pp. 145 and 228, 1997.

Dale Skeen, "New forms of persistent queries are necessary to handle live business data as it speeds through a company", BYTE Magazine, Feb. 1998, Core Technologies, Real-Time Queries in the Enterprise.

S. Shelper, "NFS Version 4 Design Considerations", Sun Microsystems, Jun. 1999.

Evangelos P. Markatos, "On Caching Search Engine Query Results", Oct. 5, 2000, http://www.ii.uib.no/~markatos/avg/html_papers/TR241/paper.html, pp. 1-14.

Javed I. Khan, "Ordering Prefetch in Trees, Sequences and Graphs", Technical Report, Dec. 3, 1999, Internetworking and Media Communications Research Laboratories, XP-002176028, pp. i-vi.

Marimba, "OSD—Describing Software Packages on the Internet", Nov. 1, 2000, http://www.marimba.com/products/whitepapers/osd-wp.html, pp. 1-12.

"PKZIP Application Note", Dec. 28, 2000, file://C:\Documents%20and%20 Settings\mahonj\Desktop\ Zip%Format\appnote.html, pp. 1-20.

Zheng Wang et al., "Prefetching in World Wide Web", 1996 IEEE, XP-000741668, pp. 28-32.

Zhimei Jiang et al., "Prefetching Links on the WWW", 1997 IEEE, XP-002086568, pp. 483-489.

Zhigang Chen et al., "Real-Time Video and Audio in the World Wide Web", World Wide Wed Journal, 4th International World Wide Web Conference, Dec. 11-14, 1995, pp. 333-348.

Amit Shukla et al., "Storage Estimation for Multidimensional Aggregates in the Presence of Hierarchies", Proceedings of the 22nd VLDB Conference, Mumbai, India, 1996.

Mischa Schwartz, "Telecommunication Networks: Protocols, Modeling and Analysis", pp. 266-283.

Open Software Description Specification, "The Open Software Description Format (OSD)", Nov. 3, 2000, http://www.w3org/TR/NOTE-OSD.html, pp. 1-13.

Marimba, "Timbale for Windows Terminal Services: Centralized Deployment, Control and Management of Windows Terminal Server Environments", 6 pages, 2000.

Marimba, "Understanding Centralized Management of Server Content and Applications", Sep. 2000, pp. 1-16.

Fireclick, "Web Site Performance is Key to E-Commerce Success", Nov. 1, 2000, http://www.fireclick.com/products/whitepapers1b.html.

"WTE Programming Guide", WebSphere Edge Server for Multiplafforms, Version 1.0, Jul. 2000, pp. 1-40.

* cited by examiner

900

| FUNCTION | JOHN SMITH USER SELECTED STREAMING ORDER |
|---|---|
| 2 | A,G,C,B |
| 1 | K,G,R,B |
| 4 | D,E,B,M |
| 3 | A,D,C,K |

| MICROSOFT WORD | | |
|---|---|---|
| TAG | # times requested | Total time used |
| Spell Check | 500 | 3500 |
| Thesaurus | 20 | 400 |
| Track Changes | 25 | 200 |
| Facsimile Send | 15 | 20 |

Fig. 10

METHOD AND APPARATUS FOR DETERMINING THE ORDER OF STREAMING MODULES

CROSS-REFERENCE(S) TO RELATED APPLICATIONS

This application is a continuation of U.S. patent application Ser. No. 09/745,646, filed on Dec. 22, 2000, now abandoned which claims the benefit under 35 U.S.C. § 119 of U.S. Provisional patent application No. 60/177,736 entitled, "Method and Apparatus for Determining Order of Streaming Modules", filed on Jan. 21, 2000, the entire contents of which is hereby incorporated herein by reference, and which is also a continuation-in-part of U.S. patent application Ser. No. 09/120,575 entitled, "Streaming Modules" and filed on Jul. 22, 1998 now U.S. Pat. No. 6,311,221.

FIELD OF THE INVENTION

The present invention is related to a method and system for streaming modules from a server to a client and, more particularly, to an improved method and system for predicting the order in which to stream the modules to the client.

BACKGROUND

In a client-server environment, a client computers can communicate with a server to remotely access information stored at the server. The transfer of information between the server and client computer may be provided using standard protocols and software applications. For example, a hypertext markup language (HTML) browser application at a client computer can communicate over the public Internet using TCP/IP and hypertext transfer protocols (HTTP) to receive web pages from a HTTP server. Web pages may include formatted text as well as multimedia elements, such as embedded graphics and sounds. The multimedia elements may be downloaded by the client and presented to a user by a browser application or a "plug in" browser component. Example browser applications include Netscape Navigator 4.0® and Microsoft Internet Explorer 4.0™.

Browser applications used at client computers can use plug-in software to receive audio and video information using a streaming data transmission protocol. A streaming protocol allows information to be presented by a client computer as it is being received. For example, full-motion video can be sent from a server to a client as a linear stream of frames. As each frame arrives at the client, it can be displayed to create a real-time full-motion video display. Audio and video streaming allows the client to present information without waiting for the entire stream to arrive at the client application. Audio and video streaming are provided by, for example, the RealAudio® and RealVideo™ applications from RealNetworks, Inc.

Browser applications may also make use of executable software applets to enhance the appearance of HTML-based web pages. Applets are software programs that are sent from the server to the client in response to a request from the client. In a typical applet use, HTML-based web pages include HTTP commands that cause a browser application to request an applet from a server and to begin execution of the applet. The applet may thereafter interact with a user to gather and process data, may communicate data across a network, and may display results on a computer output device. Applets may be constructed from a programming language which executes in a run-time environment provided by the browser application at the client computer. For example, the Java® programming language from Sun Microsystems, Inc., allows Java applets to be stored at a web server and attached to web pages for execution by a Java interpreter. Java Applets, may be formed from multiple Java Classes. Java Classes include executable Java code that can be downloaded from a server in response to a dynamically generated request to execute the class (a module execution request). If a Java Class is not available to a Java interpreter when an executing applet attempts to access functionality provided by the Class, the Java interpreter may dynamically retrieve the Class from a server. Other programming languages, such as Microsoft Visual Basic® or Microsoft Visual C++®, may also be used to create applet-like software modules, such as Microsoft ActiveX™ controls.

Downloadable applets can also be used to develop large and complex programs. For example, a complex financial program may be constructed from a collection of applets. In such a financial program, separate applets may be used to gather information from a user, compute payments, compute interest, and generate printed reports. As particular program functions are required by a user, the applets associated with the required functions can be retrieved from the server. However, as the size of a software application increases, delays associated with retrieving is modules over a network likewise increase and may be unacceptable to end-users. Consequently, an improvement in the transmission of software modules between computers is desirable.

SUMMARY OF THE INVENTION

The invention includes methods and systems for streaming data modules between a first and a second computer. The modules may be streamed regardless of the existence of a "natural" order among the modules. For example, unlike streaming applications that rely on a natural linear ordering of data to determine the data stream contents, the disclosed streaming mechanism is not constrained to operate according to a linear data ordering. Instead, streamed data modules are selected using predetermined criteria that can be independent of the particular data content.

In an exemplary application, the disclosed streaming mechanism can provide user-dependent streaming of software modules. For example, a home banking application may include modules #1 through #5. A first banking application user may, based on the user's input choices at a menu screen, access the modules in the order 1-3-4-5 while a second user may access the modules in the order 2-4-1. For such a banking application, the predetermined criteria used to determine a streaming sequence may detail each user's module usage pattern. Predetermined criteria associated with the application's users may indicate a preferred streaming sequence 1-3-4-5 when the first user is accessing the banking application but may indicate the preferred sequence 2-4-1 when the second user is accessing the application. The streamed sequence may therefore conform to a historical user-dependent access pattern. Other types of predetermined criteria may also be used. The disclosed streaming mechanism may also be use to stream non-executable data such as hypertext markup language data, binary graphics, and text.

In general, in one aspect, the invention features a computer-implemented method of transmitting modules from a first computer to a second computer. At the first computer, a module set is formed by selecting a sequence of modules from a collection of available modules. Each of the selected modules are associated with an application executing at the second computer. The selected modules may be transparently streamed from the first computer to the second computer. The selection of modules is made in accordance with predetermined selection criteria and is independent of the second computer's execution environment.

Implementations of the invention may include one or more of the following features. A module may include non-executable data, such as hypertext markup language data, and/or program code. The selection criteria may be stored in a streaming control database. The streaming control database may include transition records associating weighted values with transitions between selected modules in the collection. Processing of transition record information, such as by using a path determination algorithm, may be used to determine the sequence of modules. The streaming control database may include list records each of which identifies a predetermined sequences of modules. Selection of modules may be made by selecting a list record. Selecting a sequence of modules may include sending data from the second computer to the first computer to identify each module in the sequence or to identify the status of the executing application. For example, data identifying the status may include a series of user input values.

Implementations may also include one or more of the following features. Streaming of the module set may be interrupted, a second sequence determined, and streaming of the second sequence may occur. The streaming of the module set may be interrupted by a request for a particular module that is sent from the second computer to the first computer. For example, a Java Applet may interrupt a stream of Java Classes by attempting to access a Java Class that has not already been streamed to the second computer. A sequence of modules may be streamed and stored at the second computer independent of the executing application. That is, the executing application need not initiate streaming and need not be aware of the streaming process. Streamed modules may be subsequently integrated with the application at the second computer by interconnecting logic in a streamed module with logic in the application.

Implementations may also include one or more of the following features. The application may include an interrupt statement. Execution of the interrupt statement may transfer control to an executor program. The executor program functions in the manner of a program code debugger by responding to the interrupt statement and preventing the permanent cessation (termination) of the executing application process. The executor program may thereafter integrate logic in a streamed module with the application's logic by replacing the interrupt statement (generally, as part of a block of replacement logic) with replacement logic from the streamed module. The application may thereafter continue executing, generally by executing replacement logic that has been substituted for the interrupt statement. The application may also include a stub procedure that can be replaced by logic in a streamed module. Replacement of the stub procedure may be direct, such as by removing the stub procedure code and replacing it with logic from a streamed module, or replacement may be operative, such as by creating a link to logic in a streamed module.

In general, in another aspect, the invention features a computer program residing on a computer-readable medium. The computer program includes instructions for causing a computer to access a collection of modules associated with an application, to access a database storing module selection criteria, to form a module set by selecting a sequence of modules from the collection in accordance with the module selection criteria, and to transparently stream the module set to a second computer. Implementations of program may also include instructions for causing the computer to retrieve a first module from the collection and to send the first module to the second computer.

In general, in another aspect, the invention features a computer program residing on a computer-readable medium. The program includes instructions for causing a computer to execute an application, to transparently receive a module associated with the executing application, to store the received module independent of the executing application, and to integrate the received module with the executing application.

In general, in another aspect, the invention features a system for transferring information modules between computers. The system includes a first computer and a second computer. The first computer includes means for executing an application, means for receiving a sequence of modules associated with the application while the application is executing, and means for integrating a first module in the received sequence with the application. The second computer includes means for storing a collection of modules associated with the application, means for selecting a sequence of modules from the collection, and means for transferring the selected sequences from the first computer to the second computer.

Implementations may include one or more of the following advantages. Delays experienced when downloading an applications, a code module, or a data modules can be can be reduced. Software and data modules can be predictively delivered to a client workstation according to a particular end user's requirements. The order in which modules are streamed from a server to a client can be dynamically determined. A collection of module delivery sequences can be associated with a particular application or user and the sequences can be dynamically updated. Module delivery sequences can be determined based on individual software usage patterns or stored statistic associated with module usage. Module streaming can be interrupted and altered during the execution of an application. Implementations may include additional or alternative advantages as will become clear from the description and claims that follow.

Various techniques can be used to select the particular order in which the modules should be streamed to a given client. The selection criterion can be stored in a streaming control database, which database can include transition records associating weighted values with transitions between selected modules. Weight values can be determined by a historical count of the number of times that modules were requested by all users. Alternatively, weight values for different subgroups of users can be determined by a historical count of the number of times that modules were requested by each subgroup.

Path determination algorithms can be used to predict a sequence of modules to stream using weight values. In certain instances, sets of modules will always be streamed if one module in the set is streamed. In these instances, all modules in the set are grouped together and sent to the client as a batch. Path determination algorithms can also factor in the size of the various modules and the size of the cache memory at a client computer to maximize use of the client's cache memory.

In addition to the use of path determination algorithms to determine module sequences, a user can self-select a specific module sequence for a given function to have streamed each time the user accesses the function. The user can also self-select a sequence of functions such that the modules supporting the various functions will be streamed in an order of the function sequence. Particular modules can also always be streamed to the client computer regardless of historical usage or user selection. Further, certain modules can be "tagged" by application owners, and a record of the number of times a tagged module is requested at the client and possibly the time used at the client be created.

BRIEF DESCRIPTION OF THE FIGURES

The foregoing and other features of the present invention will be more readily apparent from the following detailed description and drawings of illustrative embodiments of the invention in which:

FIG. 9 is a sample table illustrating a user selected function and module streaming order; and FIG. 10 is a sample table illustrating usage summaries for designated modules.

DETAILED DESCRIPTION OF THE PREFERRED EMBODIMENTS

Figure 1:
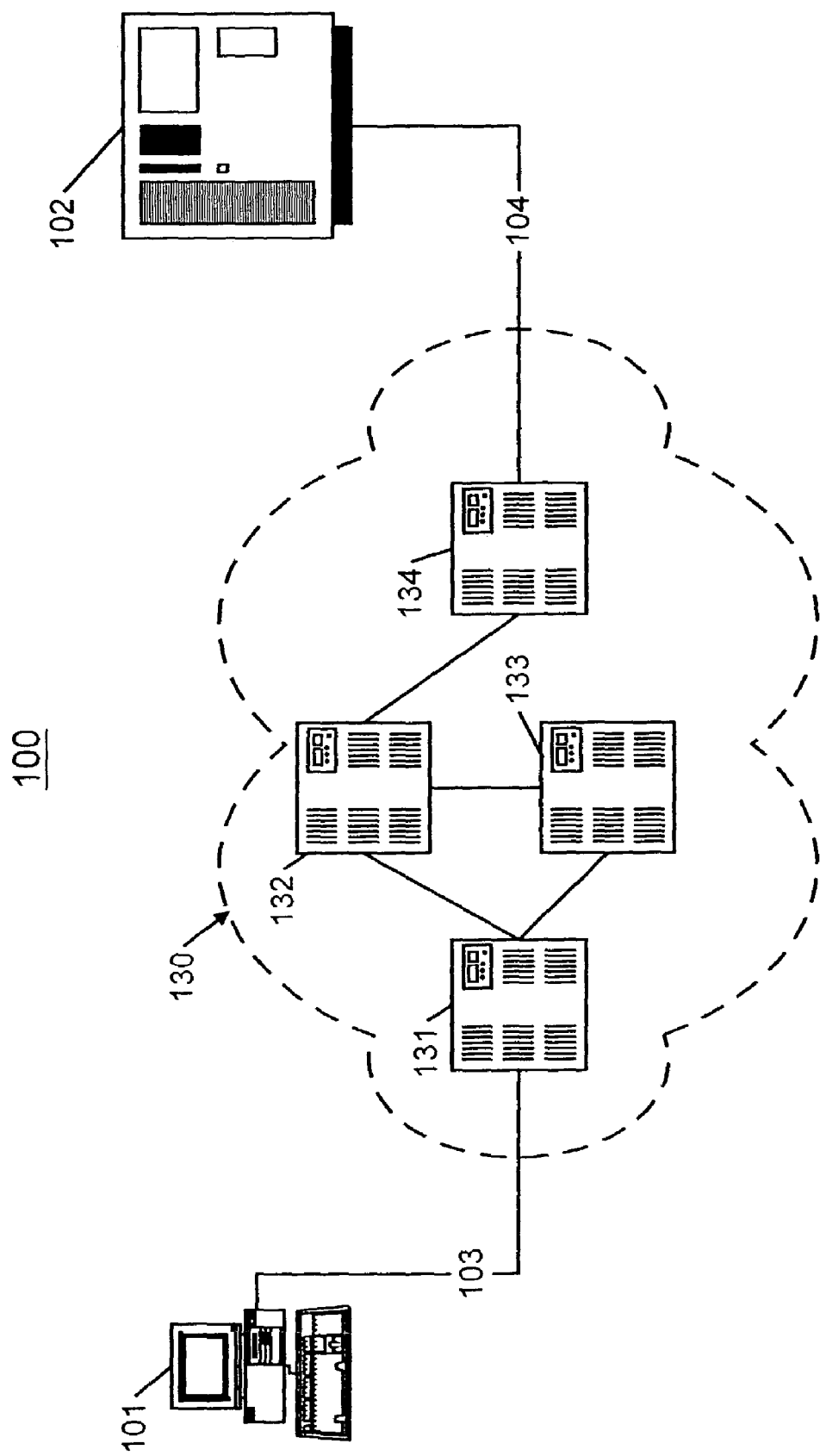
FIG. 1 illustrates a computer network.

Referring to FIG. 1, a wide area network 100 is shown. In the network 100, a client computer 101 can communicate with a server computer 102 by sending data over links 103 and 104 to a data network 130. The data network 130 may include multiple nodes 131-134 that can route data between the client 101 and the server 102. The client computer 101 may transmit and receive data using the TCP/IP, HTTP, and other protocols. For example, the client 101 may use the HTTP protocol to request web pages from the server 102.

Web pages and multimedia data sent from the server 102 to the client 101 may have a natural linear sequence associated with them. The natural sequence of video data may be the linear order of video frames while the natural sequence of text may be the order in which pages of text are arranged in a document. Data having a natural linear sequence can be streamed from a server to a client to minimize download delays. In a streaming system, while earlier items in a linear sequence are being processed and/or displayed, subsequent items may be downloaded to the client computer. When processing and/or display of an item is complete, processing or display of a fully received "streamed" item may quickly begin. Since receipt of a streamed item is fully or partially complete when the item is requested, a user or client application requesting the streamed item will perceive a reduced downloading delay. For example, if the first page of a document is retrieved by a user, the second page can be downloaded while the first page is being read. If the user continues reading at the second page of the document, that page will then be available at the client, such as in a cache area on a hard disk drive, and can be read without additional downloading delay.

Software execution may not follow a predictable natural linear order. Software may include jump statements, break statements, procedure calls, and other programming constructs that cause abrupt transfers of execution among sections of executing code. The execution path that is traversed during the processing of interrelated code modules (such as code segments, code classes, applets, procedures, and code libraries), will often be non-linear, user dependent, may change with each execution of the application program, and may change depending on the state of various data items. Although a natural order may be lacking, an advantageous order may be determined in which to stream modules. The order may be determined using criteria that is independent of the computer's internal architecture or internal operating system (execution environment) considerations.

Figure 2:
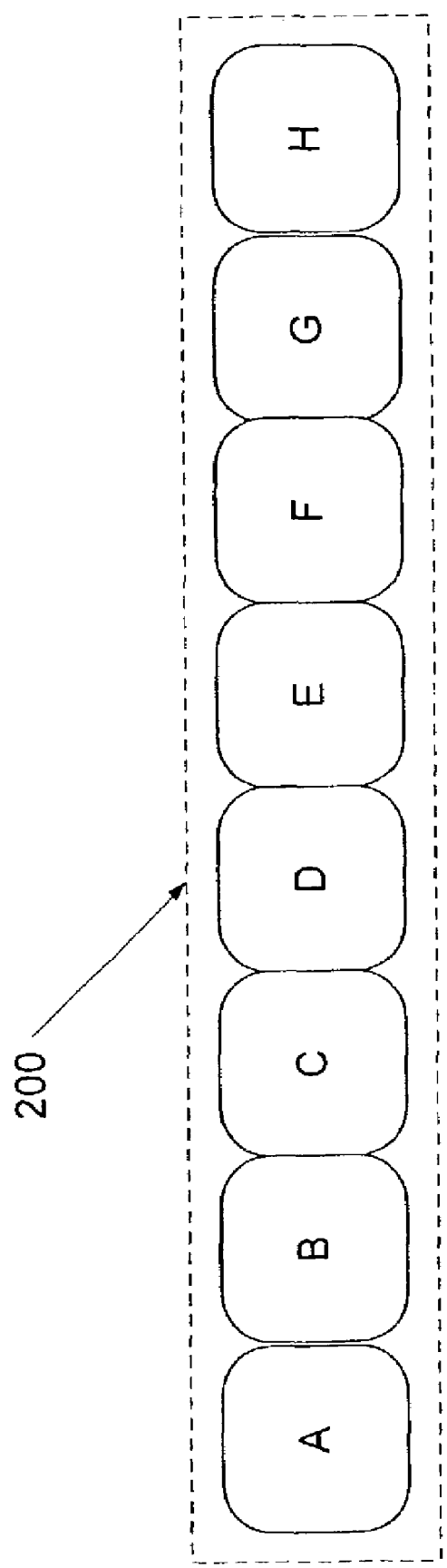
FIG. 2 illustrates computer software application modules.

Referring to FIG. 2, a software application 200 may include multiple modules "A" through "H." Modules "A" through "H" may be Java Classes, C++ procedure libraries, or other code modules that can be stored at a server. Some of the modules "A" through "H" may also be stored at the client computer, such as in a hard disk drive cache or as part of a software library stored at the client computer. When a client computer begins execution of the application 200, a first module, such as module "A," may be downloaded from the server and its execution at the client 410 may begin. As module "A" is being processed, the programming statements contained therein may branch to, for example, module "E." If Module "E" is not already resident at the client, the execution of module "A" can be suspended, module "E" can be retrieved from the server, and then the execution of module "E" code may begin. In such a scenario, a user will experience a module download delay associated with retrieving module "E" from the server.

Figure 3:
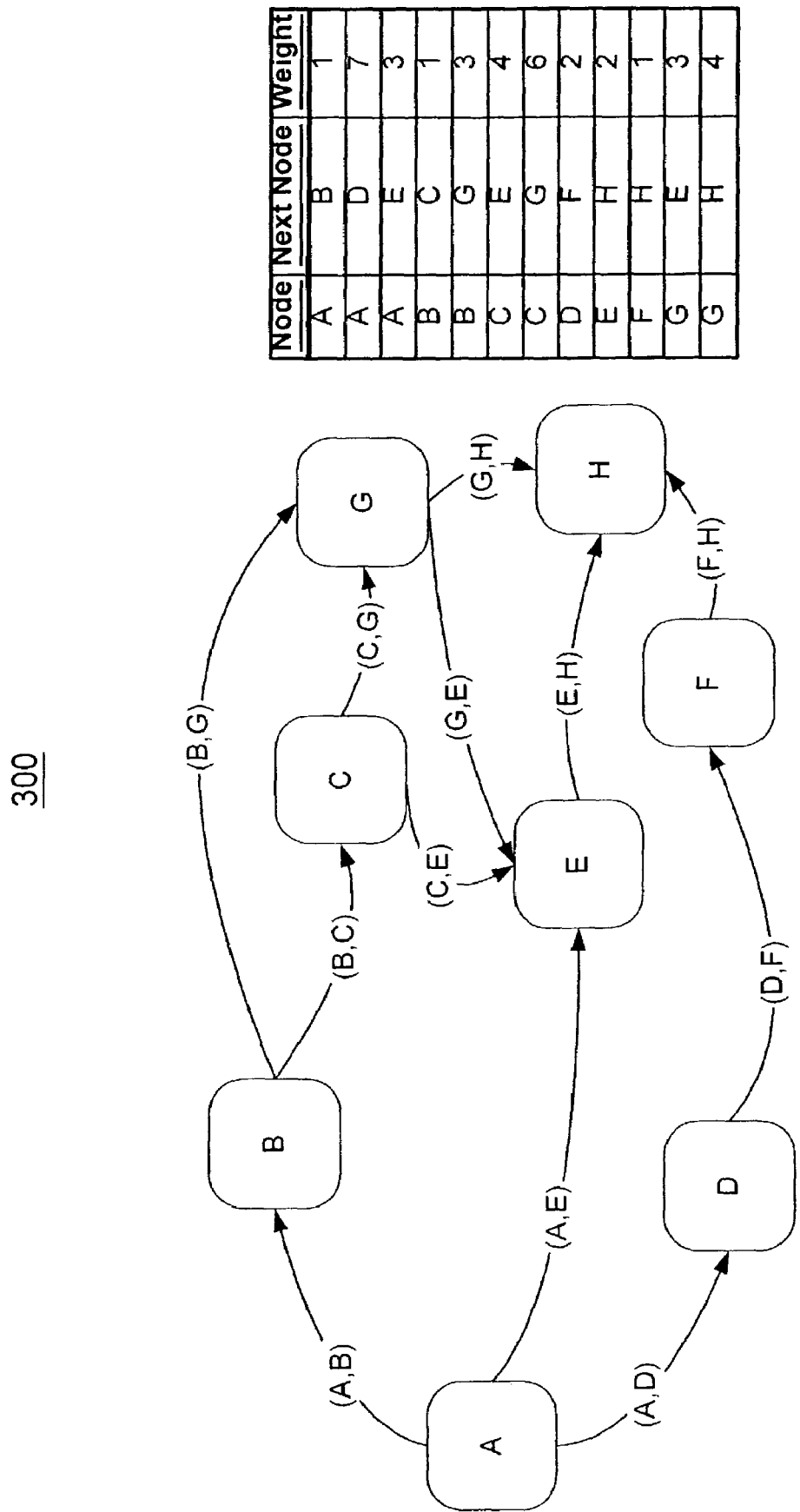
FIG. 3 is a directed graph, according to the invention.

To minimize module download delays experienced by a user, module "E" may be transparently streamed from a server to the client computer. Transparent streaming allows future module use to be predicted and modules to be downloaded while other interrelated modules "A" are executing. Referring to FIG. 3, the execution order of application modules "A" through "H" may resemble a directed graph 300 rather than a linear sequence of modules. For example, as illustrated by the graph 300, after module "A" is executed, execution can continue at module "B," "D," or "E." After module "B" is executed, execution can continue at module "C" or "G." The execution path may subsequently flow to additional modules and may return to earlier executed modules.

Figure 4:
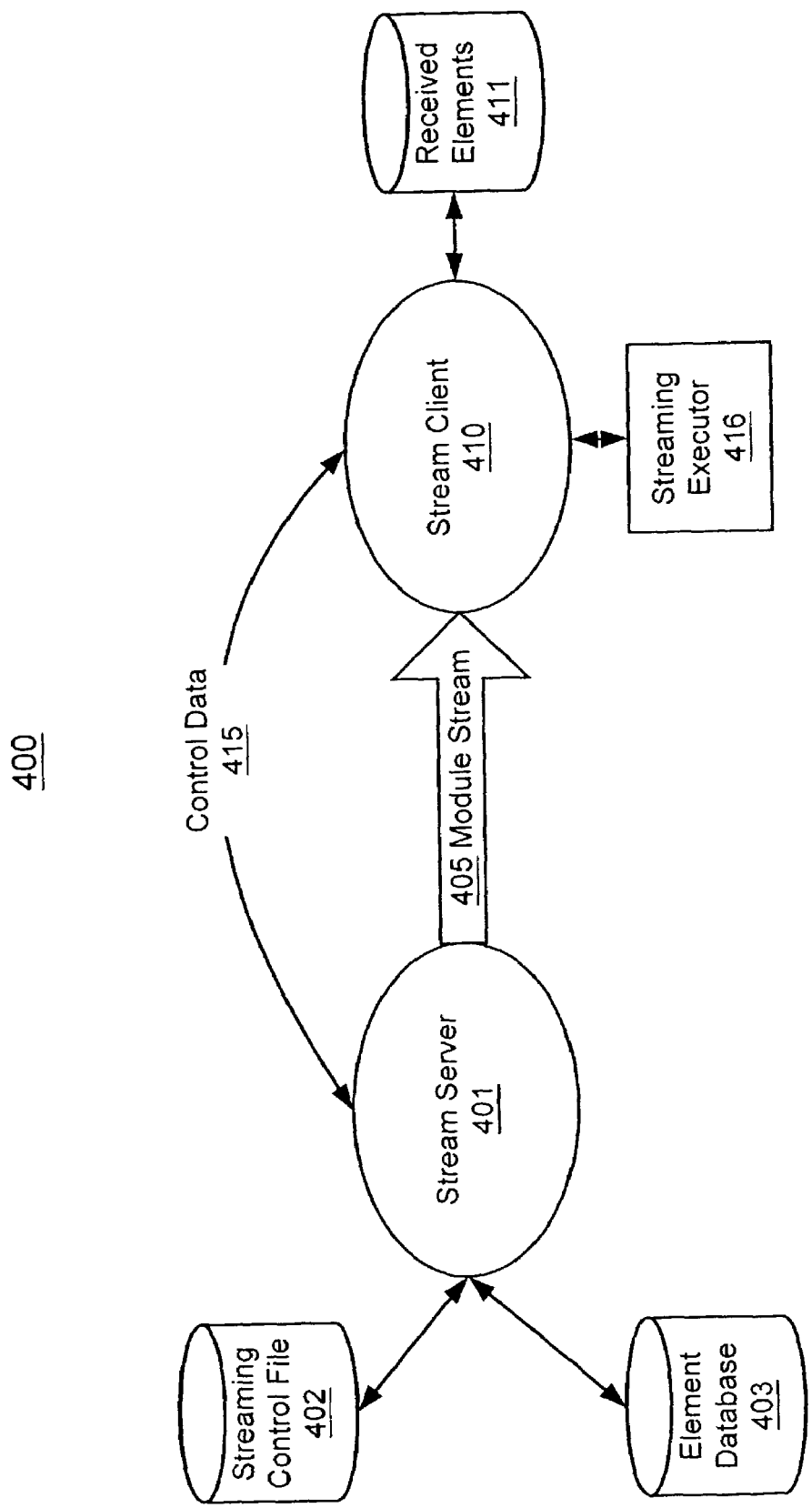
FIG. 4 illustrates a server and a client, according to the invention.

Turning to FIG. 4, an exemplary software architecture 400 providing transparent streaming is shown. The software architecture 400 includes a streaming server 401 having a database 403 of stored software modules. The streaming server 401 can transparently transmit a stream of software modules 405 over a communications link to a client computer 410. The communication link may be an analog modem connection, a digital subscriber line connection, a local area network connection, or any other type of data connection between the server 401 and client 410.

During streaming of the modules, a network connection is opened to transmit data between the streaming server 401 and the client computer 410 and is preferably held open rather then opened and closed each time a module is transmitted. The client computer 410 can have a caching mechanism for caching streamed modules separate from a browser's cache. Software at the client computer 410 can monitor user activity at the client and transmit certain information back to the streaming server 401.

As particular software modules are being executed at the client 410, additional modules are sent from the server 401 to the client 410. In a dynamic streaming implementation, the order in which modules are streamed between the server and client may be altered based on the particular client computer 410 being served, based on the user of the client computer, and based on other dynamically determined factors.

The server 401 can use streaming control information 402 to determine the order in which to stream modules from the server 401 to the client 410. The streaming control information 402 can include, for example, a predicted execution flow between software modules such as that represented by the directed graph 300. As downloaded modules are executed by the client 410, the client may send control data 415 to the server 401 to dynamically update and alter the order in which modules are streamed from the server 401 to the client 410. Control data 415 may be used to request particular modules from the server 401, to send data regarding the current execution state of the application program, to detail the current inventory of modules residing in the client's local storage 411, and to report user input selections, program execution statistics, and other data derived regarding the client computer 410 and its executing software.

The sequence of modules sent in the stream 405 from the server 401 to the client 410 can be determined using a streaming control file 402. The streaming control file 402 includes data used by the server to predict modules that will be needed at the client 410. In a graph-based implementation, the control file 402 may represent modules as nodes of a directed graph. The control file 402 may also represent possible execution transitions between the modules as vertices ("edges") interconnecting the nodes.

Referring to in the weighted graph implementation, the streaming control file 402 may include a list of vertices represent possible transitions between modules. For example, Table 1 list vertices representing all possible transitions between the modules "A" through "H" of graph 300 (FIG. 3). Each vertex in Table 1 includes a weight value indicating the relative likelihood that the particular transitions between modules will occur. In the example of Table 1, higher weight values indicate less likely transitions.

The server 401 may apply a shortest-path graph traversal algorithm (also known as a "least cost" algorithm) to determine a desirable module streaming sequence based on the currently executing module. Example shortest-path algorithms may be found in Telecommunications Networks: Protocols, Modeling and Analysis, Mischa Schwartz, Addison Wesley, 1987, § 6. For example, the following table 1 shows the minimum path weight between module "A" and the remaining modules:

TABLE 1

Shortest Paths from Application Module "A":

| From | To | Shortest Path Weight | Path |
|------|----|----|------|
| A | B | 1 | A-B |
|   | C | 2 | A-B-C |
|   | D | 7 | A-D |
|   | E | 3 | A-E |
|   | F | 9 | A-D-F |
|   | G | 4 | A-B-G |
|   | H | 5 | A-E-H |

Based on the weight values shown, the server 401 may determine that, during the execution of module "A", the module streaming sequence "B," "C," "E," "G," "H," "D," "F" is advantageous. If a particular module in a determined sequence is already present at the client 402, as may have been reported by control data 415, the server 401 may eliminate that module from the stream of modules 405. If, during the transmission of the sequence "B," "C," "E," "F," execution of module "A" completes and execution of another module begins, the server may interrupt the delivery of the sequence "B," "C," "E," "G," "H," "D," "F," calculate a new sequence based on the now executing module, and resume streaming based on the newly calculated streaming sequence. For example, if execution transitions to module "B" from module "A," control data 415 may be sent from the client 410 to the server 401 indicating that module "B" is the currently executing module If module "B" is not already available at the client 410, the server 401 will complete delivery of module "B" to the client and determine a new module streaming sequence.

By applying a shortest-path routing algorithm to the edges of Table 310 in FIG. 3 based on module "B" as the starting point, the minimum path weights between module "B" and other modules of the graph 300 can be determined, as shown in Table 2, below:

TABLE 2

Shortest Paths from Module B

| From | To | Shortest Path Weight | Path |
|------|----|----|------|
| B | C | 1 | B-C |
|   | E | 5 | B-C-E |
|   | G | 3 | B-G |
|   | H | 7 | B-C-E-H |

Based on the shortest path weights shown in Table 2, the server 401 may determine that module streaming sequence "C," "G," "E," and "H" is advantageous.

Other algorithms may also be used to determine a module streaming sequence. For example, a weighted graph 300 may be used wherein heavier weighted edges indicate a preferred path among modules represented in the graph. In Table 3, higher assigned weight values indicate preferred transitions between modules. For example, edges (A,B), (A,D), and (A,E) are three possible transitions from module A. Since edge (A,B) has a higher weight value then edges (A,D) and (A,E) it is favored and therefore, given module "A" as a starting point, streaming of module "B" before modules "D" or "E" may be preferred. Edge weight values can be, for example, a historical count of the number of times that a particular module was requested by a client, the relative transmission time of the code module, or a value empirically determined by a system administrator and stored in a table 402 at the server 401. Other edge weight calculation methods may also be used.

TABLE 3

Preferred Path Table

| Edge | Weight |
|------|--------|
| (A, B) | 100 |
| (A, D) | 15 |
| (A, E) | 35 |
| (B, C) | 100 |
| (B, G) | 35 |
| (C, E) | 50 |
| (C, G) | 20 |
| (D, F) | 50 |
| (E, H) | 50 |
| (F, H) | 100 |
| (G, E) | 35 |
| (G, H) | 25 |

In an preferred-path (heavy weighted edge first) implementation, edges in the graph 300 having higher weight values are favored. The following exemplary algorithm may be used to determine a module streaming sequence in a preferred-path implementation:

1: Create two empty ordered sets:
   i) A candidate set storing pairs (S,W) wherein "S" is a node identifier and "W" is a weight of an edge that may be traversed to reach node "S."
   ii) A stream set to store a determined stream of code modules.
2: Let Si be the starting node.
3: Append the node Si to the Stream Set and remove any pair (Si, W) from the candidate set.
4: For each node Sj that may be reached from node Si by an edge (Si, Sj) having weight Wj:
   {
   If Sj is not a member of the stream set then add the pair (Sj, Wj) to the candidate set.
   If Sj appears in more than one pair in the candidate set, remove all but the greatest-weight (Sj, W) pair from the candidate set.
   }
5: If the Candidate set is not empty
   Select the greatest weight pair (Sk,Wk) from the candidate set.
   Let Si=Sk
   Repeat at step 3

For example, as shown in Table 4, below, starting at node "A" and applying the foregoing algorithm to the edges of Table 3 produces the stream set {A, B, C, E, H, G, D, F}:

TABLE 4

Calculation of Stream Set

| Iteration | {Stream Set}/{Candidate Set} |
| --- | --- |
| 1 | {A}/{(B, 100)(D, 15)(E, 35)} |
| 2 | {A, B}/{(D, 15)(E, 35)(C, 100)(G, 35)} |
| 3 | {A, B, C}/{(D, 15)(E, 35)(G, 35)} |
| 4 | {A, B, C, E}/{(D, 15)(G, 35)(H, 50)} |
| 5 | {A, B, C, E, H}/{(D, 15)(G, 35)} |
| 6 | {A, B, C, E, H, G}/{(D, 15)} |
| 7 | {A, B, C, E, H, G, D}/{(F, 50)} |
| 8 | {A, B, C, E, H, G, D, F}/{ } |

Implementations may select alternative algorithms to calculate stream sets and the predictive streaming process can be dynamically updated should a user request a module that was not predicted and used to predict a new module sequence starting from the requested module.

Figure 6:
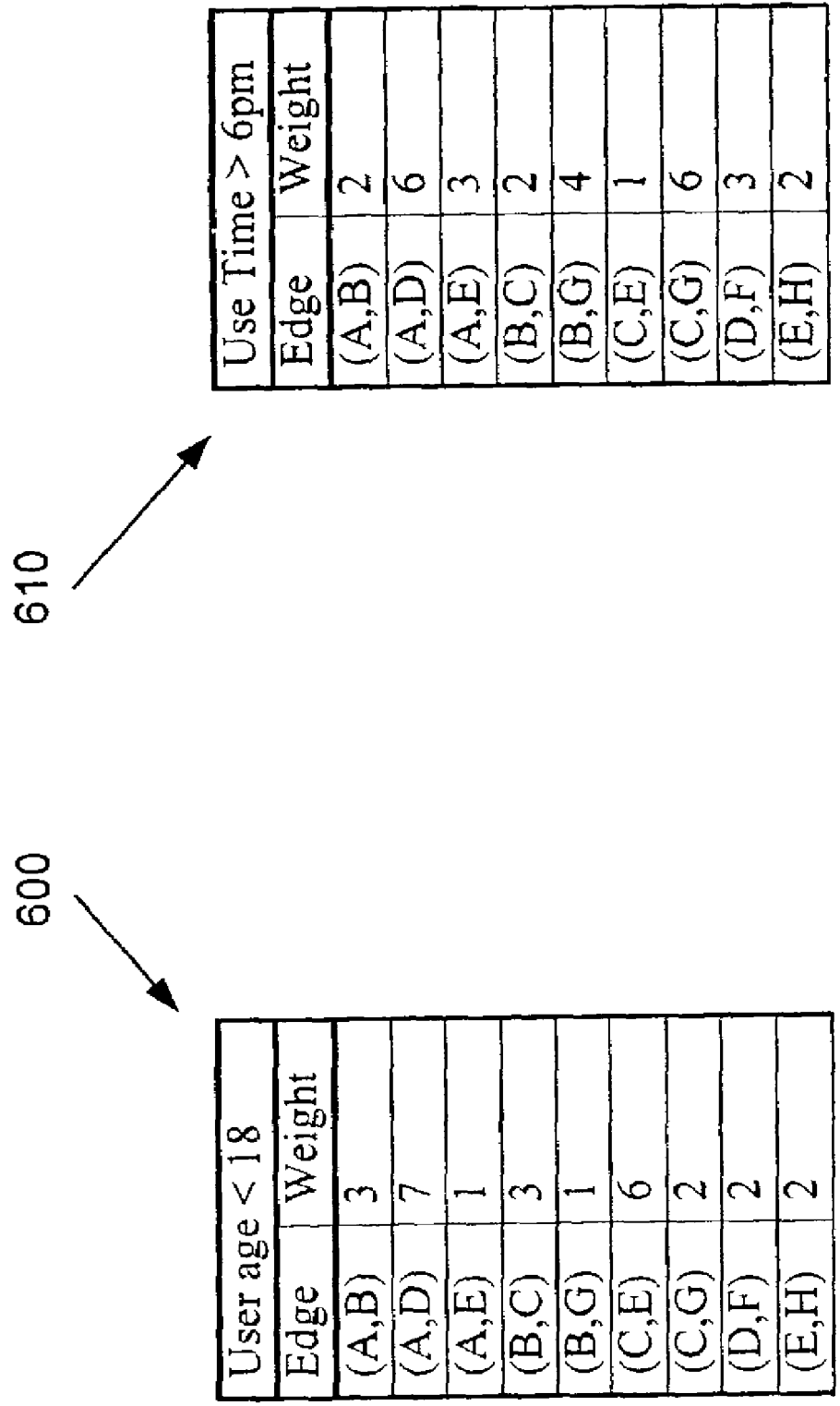
FIG. 6 shows sample edge weighting tables for the graph of FIG. 3.

Rather than use one table based on the historical count for all users to determine the weight value for each particular transition, multiple tables can be created based upon historical usage of different subcategories of users. In the preferred embodiment, tables are created based upon user age and time of usage. Depending on the application the modules are associated with, in alternative embodiments other subcategories of users can be used, such as user income, sex, etc. Referring to FIG. 6, sample table 600 shows a graph edge table for users under the age of 18, and table 610 shows a graph edge table for users during non-business hours after 6 PM. Tables 600 and 610 can be stored in the streaming control file 402, along with any other graph edge tables generated based on different subcategories of users. Prior to execution of an application by a user at a client, the user can be queried to enter relevant user demographics in order to determine which graph edge table in the streaming control file to use to determine the order of the modules to stream.

According to a further aspect of the invention, the edge weight tables stored in the control file can be analyzed to identify sets of modules which, if one module in the set is streamed, then all modules in the set are streamed. In particular, weight edges in the weight edge table can be analyzed to identify sequences of modules with identical weight values. These modules can then be always streamed together as a batch rather than individually. In the graph edge implementation, this can be viewed as a merging of nodes which lie along a branchless path.

Figure 7:
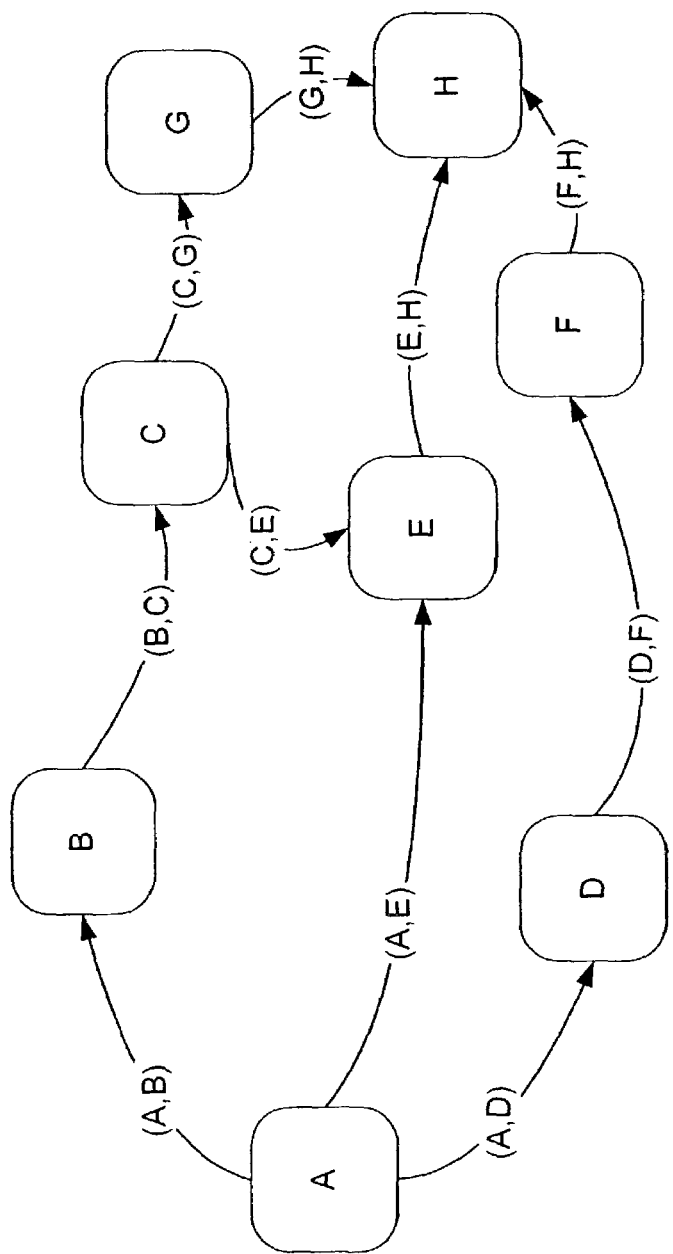
FIGS. 7 and 8 are edge graph illustrations of a module-grouping procedure.
Figure 8:
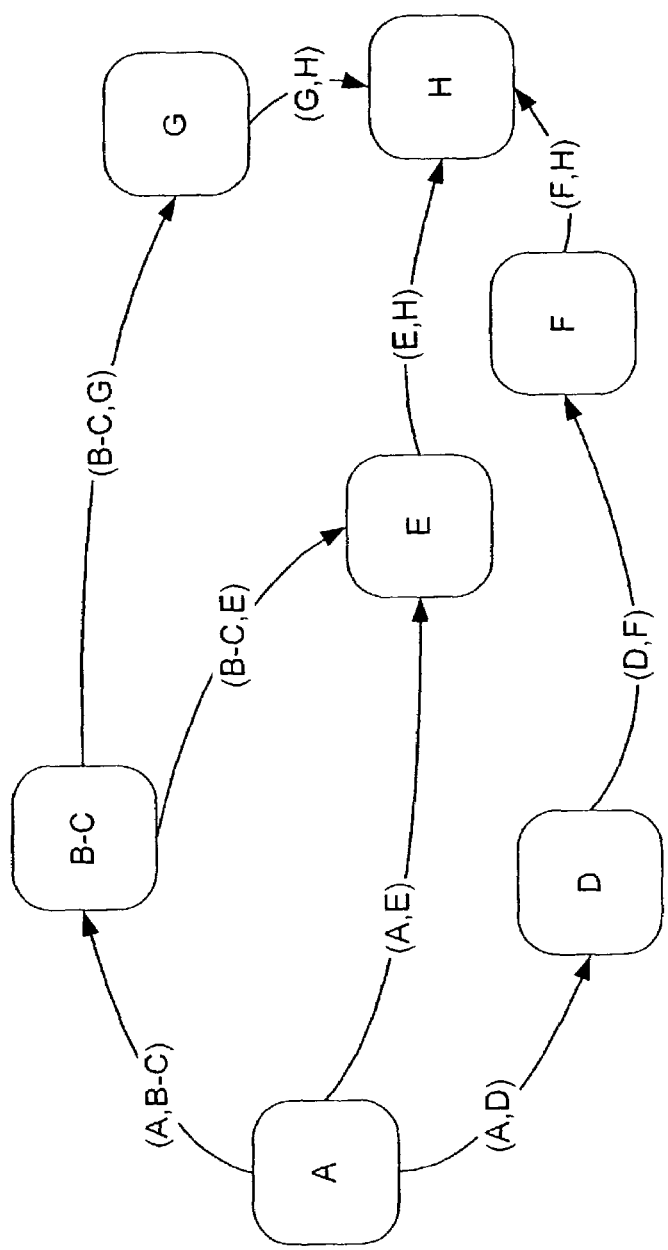

Referring to FIG. 7, a graph edge table 710 for graph 700 is shown with weight values generated by a historical usage count. Weight edges in the weight edge table are analyzed to identify sequences of modules with identical weight values. The weight value from module A to B is 1, as is the weight value from module B to C. Since module B will never be streamed without being followed by module C, the nodes represented by modules B and C can be merged. Thus, rather than streaming modules B and C separately, if the path determination algorithm determines that module B should be streamed, then modules B and C are batched and sent together. Referring to FIG. 8, the resulting edge weight table 810 and graph 800 is shown.

In addition to the weight edge values, path determination algorithms can utilize the size of the cache memory at the client and the sizes of the modules as factors in determining which modules to stream, with the goal of the analysis to maximize use of the client's cache memory and minimizing streaming time. The size of the client cache can be transmitted to the streaming server at the beginning of each client-server interaction, such as the initiation of a streaming session.

For example, a path determination algorithm may determine that a first sequence of modules to stream, A-B-C-E-H, would occupy 80% of the client cache memory while a second sequence A-B-C-E-G, although less likely than path A-B-C-E-H, will occupy 95% of the cache memory if module G occupies 15% more of the cache memory more than module H. The sequence A-B-C-E-G can be streamed to the client to maximize the amount of cache memory occupied. Should the user later request module G after module E, the larger module G, which requires more time to stream than module H, is already present on the client. Should the user instead request module H after module E, the smaller size of module H will allow for faster on-demand streaming, and thus reduce the penalty of an incorrect streaming prediction.

In addition to using predictive algorithms based on historical usage patterns, the sequence of streamed modules can also be user defined at an individual level. Referring to FIG. 9, a table 900 uniquely associated with a particular user can be generated based on user selections which are used to identify the sequence of modules for each function in an application to be streamed based on a user's selections. In the preferred embodiment, table 900 is stored at the client and uploaded to the application server when the user accesses the server. In an alternative embodiment, table 900 can be stored in on the server, e.g., as a list record in the streaming control file The user-selected streaming order can be generated during an interactive dialog between the client and server. For example, in one embodiment, a user at the client is given the option to enter a "Select Streaming Order" mode during which the user is instructed to perform a particular sequence of selections for a function that the user considers typical of the way in which the user anticipates behaving each time the user performs that particular function. A particular sequence of selections can be made for the modules associated with each function in the streaming application. The user selections can be used as default streaming settings each time the user logs on and attempts to perform a particular function. For users who may use functions in a streaming application in an a-typical manner, and thus in a way which is difficult to predict, these selections allow for faster streaming application of the application.

Even if a user has selected a preferred streaming order, if the user deviates from the default selected streaming order, the server can utilize other methods to determine a subsequent streaming order, such as prediction algorithms based on historical usage patterns. Predictive algorithms, such as historical usage patterns, can also be used to select streaming orders for functions that do not have a personalized streaming order associated with them for the respective user.

In addition to selecting the sequence of modules for each function, or alternatively, the user can select the order of the functions to be streamed. Referring to FIG. 9, the user has selected that the application functions be streamed in the order 2, 1, 3, and 4, based, for example., on the user's assessment of the sequence of functions they will use in the application. These selections can be stored in a suitable table 900 associated with the user. The next time that the user accesses the application on the server, the server will begin streaming modules corresponding to Function 2, in an order specified by the user, e.g., in Table 900, (modules A, G, C, and B), or, if no custom order is specified, in a ordering in accordance with the predictive algorithms. Should the user deviate from the default function order, for example, by selecting function 3 after function 2, the server can reset the streaming sequence and being streaming the module for function 3 in a sequence defined by the user (here sequence D, E, B, and M) or otherwise selected as appropriate.

According to a further aspect of the invention, particular modules can always be streamed from the server to the client regardless of historical usage or user selection. Such modules are typically associated with functions which are required for the application or for certain functionality of the application. For example, if a user password is required to access function 3 shown in FIG. 9, a security module S that interacts with the user to obtain the user password will always be streamed prior to modules D, E, B, and M regardless of whether the user selects module S during the Select Streaming Order mode. In another example, when the modules being streamed are particular HTML pages, an informational title page containing information about ownership rights to the page contents can always be streamed to the client prior to the streaming of any other pages.

Depending on the particular user and modules being streamed, a combination of the methods herein disclosed for determining the order of modules to stream may be utilized. For example, path determination prediction algorithms may be utilized for functions that users have not self-selected a streaming order As another example, mandatory streaming of certain modules may be combined with user self-selected streaming orders. Similarly, various methods can be balanced against each other to determine which is the most appropriate in a given situation. For example, the use of cache memory utilization and module size as streaming order determining factors can be balanced with the probabilities that the various paths will be traversed by the user. Even if a given sequence of modules provides full cache utilization at the client, if the streamed modules are highly unlikely to be used, cache utilization would not be an appropriate factor to wholly base streaming decisions. In contrast, if a high cache utilization sequence is only slightly less likely than an alternative sequence and the modules not in the cache-based sequence can be streamed quickly, then the cache utilization sequence could provide superior overall performance.

A multitude of combinations are possible, offering versatile functionality at both the client and server. The various prediction methods and factors can be used and combined using differing weights as appropriate. The weights to assign to each of the factors and predictive methods can vary and preferably can be dynamically adjusted in response to operating conditions and measures of prediction success rates to improve the overall streaming performance.

According to yet a further aspect of the invention, streaming server software can record time and usage of specially tagged modules streamed to the clients by gathering data received from the client computers regarding use of the tagged modules, such as the number of times they are streamed to clients and, with the use of appropriate client-side software, the amount of time the tagged modules are actually used by the client. Such information can be used to determine the popularity of various modules to increase the accuracy of the predictive streaming process. The information can also be valuable to application owners in determining which functions are most useful to the users and which functions might be omitted in future version without substantial concern. In addition, in the preferred embodiment, the information gathered can be used on a per-client basis to bill users based in accordance with the specific modules used and the amount of time each module is used.

For example, a word processing program, such as Microsoft Word, is comprised of many different modules. The module corresponding to the spell check function could be tagged as "Spell Check". When the tagged module is streamed to a client or specifically requested, a request total can be incremented. In addition, client-side software can be configured to recognize the tags and both record its receipt as well as determining the length of time each particular tagged module is used. This information can subsequently be communicated to the streaming sever. FIG. 10, for example, shows a table 1000 which summarizes data gathered for various users over a given period for example several tagged modules in a word processing application. For each tag, the number of times the module was streamed to and requested at the client, and the length of time the module was used is recorded.

Figure 5B:
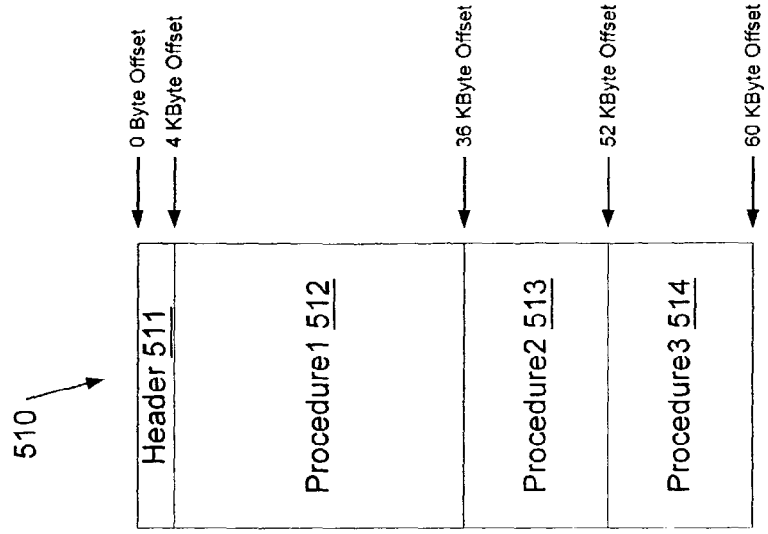
FIGS. 5A-5E illustrate application code components, according to the invention.
Figure 5A:
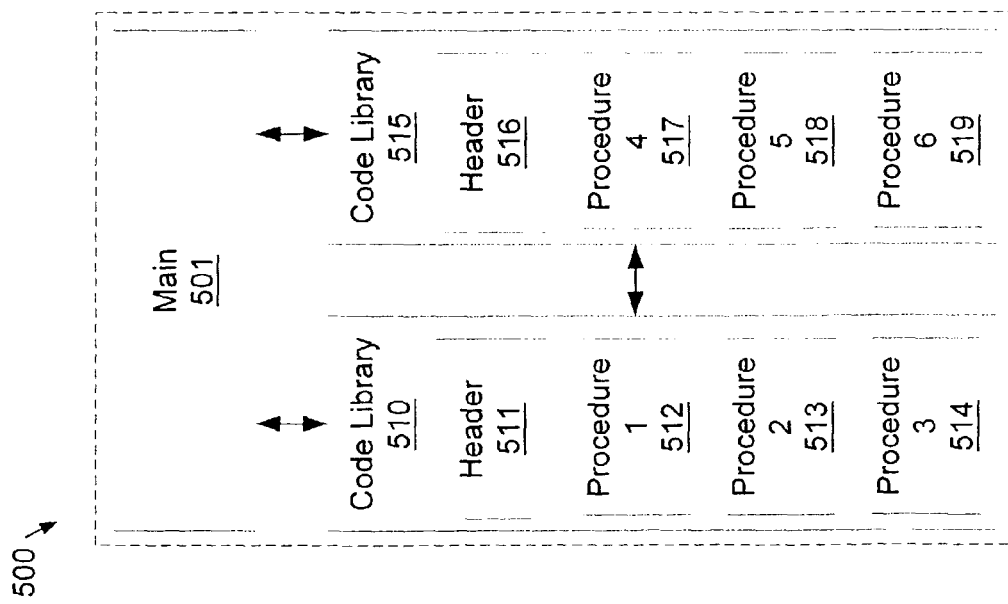

In the discussion above, streaming of applications was discussed with respect to streaming a sequence of separate application modules. Application streaming can also be used to stream subsections of an application or module. For example, subsections of compiled applications, such as applications written in C, C++, Fortran, Pascal, or Assembly language may be streamed from a server 401 to a client 410. Referring to FIG. 5A, an application 500 may include multiple code modules such as a main code module 501 and code libraries 510 and 515. The main module 501 contains program code that is executed when the application is started. The code libraries 510 and 515 may contain header data 511 and 516 as well as executable procedures 512-514 and 517-519 that are directly or indirectly called from the main module 501 and other library procedures.

In a Microsoft Windows 95/Microsoft Visual C++ implementation, the main code module 501 may contain a compiled C++"main" procedure and the library modules 510 and 515 may be dynamic link libraries having compiled C++ object code procedures. Header data 511 and 516 may include symbolic names used by operating system link procedures to dynamically link libraries 510 and 515 with the main module 501. Header data may also indicate the location of each procedure within the library. In a jump table implementation, a calling procedure may access library procedures 512-514, 517-519 by jumping to a predetermined location in the header 511 or 516 and from there, accessing additional code and/or data resulting in a subsequent jump to the start of the procedure.

Figure 5D:
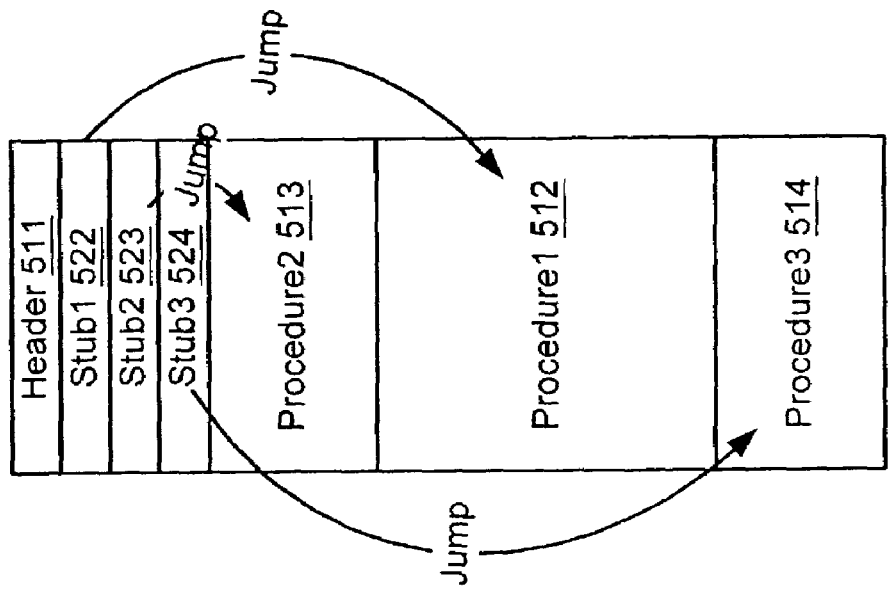
Figure 5C:
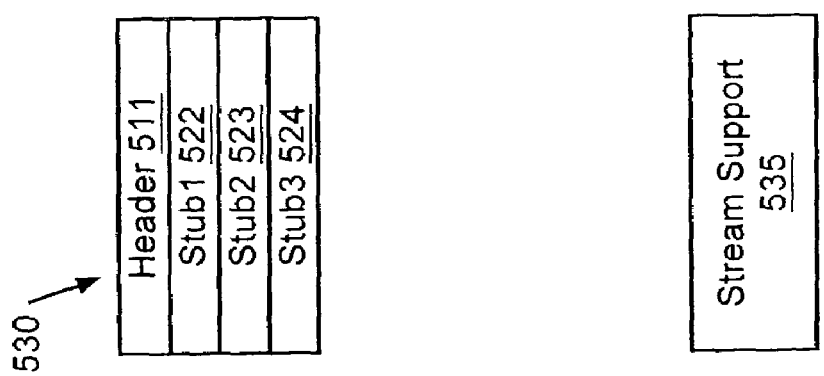
Figure 5E:
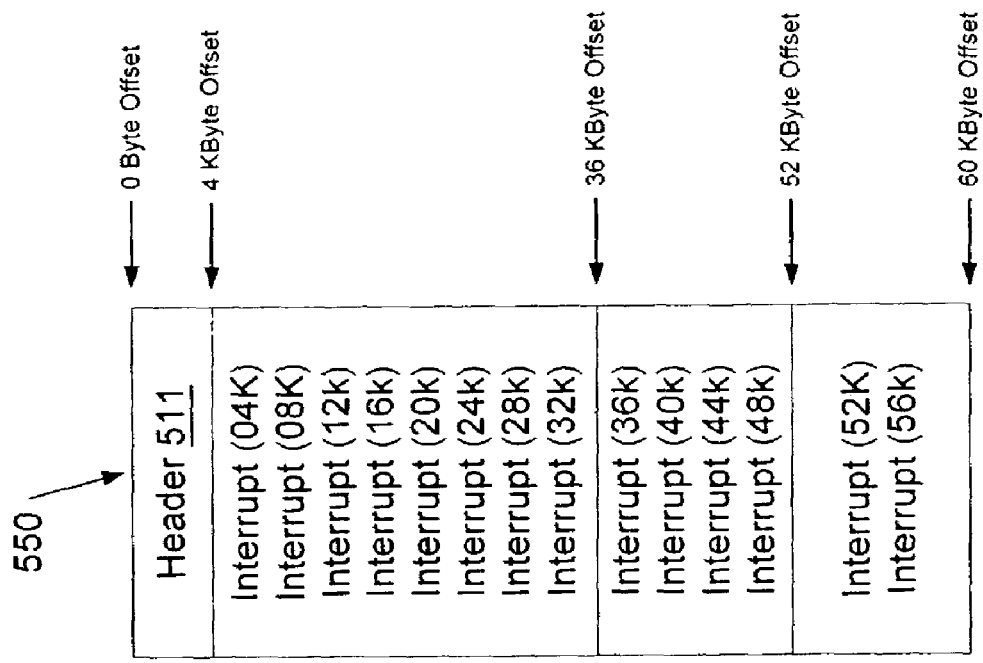

Data and procedures within an application's code modules and libraries may be many hundreds or thousands of bytes long. Prior to executing an application, a client may need to retrieve a lengthy set of modules and libraries. By reducing the size of the module and library set, the initial delay experienced prior to application execution can be reduced. In a streaming implementation of application 500, code within subsections of the application's code modules can be removed and replaced by shortened streaming "stub" procedures. The replacement of application code with streaming stub procedures may reduce module size and associated transmission delay. For example, referring to FIGS. 5A and 5B, the code library 510 may include a header 511 that is 4 kilobytes (Kbytes) in length and procedures 512-514 that are, respectively, 32 Kbytes, 16 Kbytes, and 8 Kbytes. Referring to FIGS. 5B and 5C, to reduce the size of the library 510, procedures code 512-514 may be removed from the library 510 and stored in a streaming code module database 403 at the server 401 (FIG. 4). The removed procedure code 512-514 may be replaced by "stub" procedures 522-524 resulting in reduced-size code library 530 that can be linked with application modules 501 and 515 in place of library 510. Header data 511 of library 530 can include updated jump or link information allowing stub procedures 522-524 to act as link-time substitutes for procedures 512-514.

A server 401 may provide a streaming-enabled version of application 500 to a client 410 by sending main module 501, library module 515, "streamed" library 530, and, in some implementations, a streaming support file 535 to the client 410 in response to a request for the application 500. The streaming support file 535 may include procedures accessed by the stubs 522-524 to facilitate code streaming between the server 401 and client 410. At the client 410, modules 501, 515, 530 and 535 can be linked and execution of the resulting application can begin. As the main module 501 and various called procedures are executed at the client 410, code modules stored in the database 403 can be streamed from the server 401 to the client 410. Data may be included in the stream 403 to identify stub procedures 522-524 associated with the streamed code modules. As the streamed modules are received at the client, they are integrated with the executing application.

In an appended module implementation, streamed code modules are integrated with the executing application by appending received modules to their corresponding library or code file. For example, referring to FIGS. 5C and 5D, as modules 512-514 are streamed from the server to the client, they are appended to the library file 530 thereby forming an augmented library file 540. As the modules 512-514 are streamed from the server 401 and appended to the file 530, header data 511 or stub data 522-524 is updated so that the now-appended modules are accessible from a calling procedure. For example, referring to FIG. 5D, an additional "jump" may be added between each stub procedure 522-524 and its associated appended module 512-514. Alternatively, header data 511 may be updated so that procedures 512-514 are accessible in place of stubs 522-524. In a stub-replacement implementation, stubs 522-524 are replaced by procedure modules 512-514 as the modules are received from the server 401. Stub replacement may require altering or rearranging the location of the remaining stubs or procedures within a code module or library as replacement code is received. Implementations may employ still other methods of integrating streamed code with executing applications and modules.

In some scenarios, removed code, such as procedure code 512-514 which, in the example given, was replaced by stubs 522-524, may be required (called by another procedure) before it is streamed from the server 401 and integrated with the module 530. In such a case, stub code 522-524 may access streaming functions in the streaming support library 535 to obtain the required procedure. To do so, the streaming support library 535 may send control data 415 to the server 401 to request the needed procedure. In response, the server 401 can halt the current module stream 405 and send the requested module. Upon receipt of the requested module, procedures in the streaming support library 535 may be used to integrate the received module with the application and to continue with the execution of the requested module. The server may thereafter determine a new module stream based on the requested module or other control data 415 that was received from the client.

Code modules may be reduced in size without the use of stub procedures. For example, referring again to FIGS. 4, 5A, 5B, and 5E, in a interrupt driven implementation, procedure code 512-514 may be removed from a code library 510 and stored in a database 403. Header information 511 as well as data indicating the size and location of removed procedure code 512-514 may then be transmitted to a client 410. The client 410 may construct a new library 550 by appending a series of interrupt statements in place of the removed procedure code 512-514. When the application 500 is executed, the code library 550 is substituted for the library 510 and execution of the program 500 may begin. As the program 500 executes, the removed procedure code 512-514 can be streamed to the client 410 and stored in a local database 411. If the application 500 attempts to execute procedure code 512-514 it may instead execute one of the interrupt statement that have replaced procedure code 512-514. The execution of the interrupt statement halts the execution of the program 500 and transfers control to a streaming executor program 416.

Executor 416 implements interface technology similar to that of a conventional run-time object code debugger thereby allowing the executor 416 to intercept and process the interrupt generated by the application 500. When the interrupt is intercepted by the executor 416, data provided to the executor 416 as part of the client execution platform (operating system) interrupt handling functionality can be used to identify the module 550 in which the interrupt was executed and the address of the interrupt code within the module. The executor 416 then determines whether procedure code 512-514 associated with the interrupt location has been received as part of the module stream 405 sent to the client. If the appropriate procedure code has been received, the executor 515 replaces the identified interrupt with the its corresponding code. For example, procedures 512-514 may be segmented into 4 Kilobyte code modules that are streamed to the client 410. When an interrupt statement is executed by the application 500, the executor 416 intercepts the interrupt, determines an appropriate 4 Kilobyte code block that includes the interrupt statement, and replaces the determined code block with a received code module. If the appropriate code module has not yet been received, an explicit request may be sent from the client 410 to the server 401 to retrieve the code module prior to its insertion in the library 550. The executor 416 may thereafter cause the application 500 to resume at the address of the encountered interrupt.

Implementations may also stream entire modules or libraries. For example, main code module 501 may be received from the server 401 and begin execution at the client 410 while code libraries 510 and 515 are streamed from the server 401 to the client 410. Integration of streamed modules with executing modules may be provided by client 410 dynamic module linking facilities. For example, delay import loading provided by Microsoft Visual C++ 6.0 may be used to integrate streamed modules 510 and 515 with executing modules 501. Dynamic linking of streamed modules may be facilitated by storing the streamed modules on a local hard disk drive or other storage location accessible by client 410 link loading facilities. In an exemplary implementation, streaming is facilitated by altering client 410 operating system link facilities such that the link facility can send control data 415 to the server 401 to request a particular module if the module is has not already been streamed to the client 401.

In a protected-memory computer system, direct manipulation of executing application code and data may be restricted. In such systems, a "kernel" level processes or procedure may be required to support integration of streamed modules with executing application. In such a case, streaming support 535 may be pre-provisioned by installing support procedures at the client 410 prior to the client's request for the application 500.

Other methods of determining stream sets may be used. In a list-based implementation, the streaming control file may include predetermined list of module streaming sequences. For example, the streaming control file 402 may include a module streaming sequence list associated with a first user and a second module streaming sequence list associated with a second user. Control data 415 sent from the client 410 to the server 401 may identify the current user at the client 410. Once the user has been identified to the server, the server may stream software modules in accordance with the user's associated streaming sequence list. User-based streaming data may be advantageous where a user's past behavior can be used to anticipate the order of modules to be accessed by that user.

In graph-based streaming control file implementations, the weight of edges connecting nodes may be determined statically or dynamically and may be determined based on a collection of historical usage data. For example, in a programmer-controlled implementation, a software programmer estimate the likelihood that particular transitions between nodes will occur based on the programmer's knowledge of the software code and the expected application usage patterns. Alternatively, application profiling programs may be used to gather run-time execution data recording transitions between various applets, Classes or code modules and thereby determine the likelihood that particular transitions will occur. In a client-feedback implementation, control data 415 sent from the client 410 to the server 401 during module execution is used to build a statistical database of module usage and, based on that database, determine the module streaming order.

In a client-controlled streaming implementation, streaming control data 402 may be located at the client 410 and control data 415 sent from the client 410 to the server 401 may be used to sequentially request a stream of modules from the server. For example, while the client computer 410 is executing a first module, a background process may send control data 415 to a server to request additional modules that can be buffered on a hard disk 411 at the client computer 410. A client-controlled streaming implementation may used existing HTTP servers and HTTP protocols to send request from the client 410 to the server 401 and send software modules from the server 401 to the client 410. Furthermore, although streaming of software modules has been emphasized in the foregoing description, non-executable data, such as hypertext markup language, binary graphic files, and text, may be streamed as a collection of modules.

Implementations may include a "handshaking" procedure whereby, at the start of application execution, control data 415 is sent between the server 401 and the client 410. The handshaking data may include an inventory of application modules residing at the client and at the server. Such handshaking data allows both the client 410 and server 401 to determine their respective software module inventory and to optimize the stream of software modules based on that inventory information.

In a history-dependent implementation, a server or client can store data about a series of transitions between modules and calculate a new module stream based on a history of transitions. For example, referring to FIG. 3, if the module "G" was reached by the path A-B-G, then a server or client may determine that module "E" followed by "H" is to be streamed. On the other hand, if the module "G" was reached by the path A-B-C-G then the streaming sequence may include only the module "H."

The invention may be implemented in computer hardware, firmware, software, digital electronic circuitry or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

While the present invention has been described with reference to the preferred embodiment therein, variations in form and implementation can be made without departing from the spirit and scope of the invention.

The invention claimed is:

1. A method for streaming a plurality of modules of an application from a server to a client, the method comprising:
   identifying potential execution transitions between the plurality of modules, the plurality of modules each including executable code;
   associating a weighted value with each transition, each said weighted value indicating a likelihood relative to other transitions that said transition will occur when the application is executed;
   computing an order in which the plurality of modules is to be streamed to the client, based on the weighted values associated with the transitions;
   initiating transmission of the plurality of modules to the client in said order, to cause the client to execute executable code in at least a first module of the plurality of modules while at least a second module of the plurality of modules is being transmitted to the client;

deciding, during the transmission of the plurality of modules, whether said order in which the plurality of modules is to be streamed to the client is to be modified in response to receiving data pertaining to a current execution state of the application from the client; and transmitting the plurality of modules in a modified order if said order has been decided to be modified based on the current execution state of the application.

2. The method of claim 1, wherein:

each said weighted value is further associated with a respective category; and each said weighted value used during the computing of the order is selected in accordance with the respective category.

3. The method of claim 2, wherein the respective category comprises user age and time of usage.

4. The method of claim 1, further comprising:

identifying a sequence of module transitions having the same weighted transition values;

grouping the modules in the identified sequence of module transitions into a batch; and streaming the grouped modules to the client in the batch.

5. The method of claim 1, wherein deciding whether the computed order is to be modified comprises utilizing data identifying a projected client cache utilization and a cost to stream particular modules.

6. The method of claim 5, wherein the cost comprises a module size.

7. A method for streaming a plurality of modules of an application from a server to a client, the method comprising:

receiving notice that a user is executing a particular function associated with two or more of the plurality of modules of the application, each of the plurality of modules including executable code;

if the particular function has an associated user-selected streaming order, initiating streaming of the two or more of the plurality of modules associated with the particular function to the client in the user-selected streaming order; and if the particular function does not have an associated user-selected streaming order, determining an alternative order for streaming of the two or more of the plurality of modules associated with the particular function based on data pertaining to a current execution state of the particular function and a set of predefined weighted values for transitions between modules of said two or more of the plurality of modules associated with the particular function, and streaming the two or more of the plurality of modules to the client in the alternative order.

8. The method of claim 7, wherein determining the alternative order comprises predicting an order of usage of the two or more of the plurality of modules in the particular function.

9. The method of claim 8, wherein predicting an order is performed with use of the set of predefined weighted values.

10. The method of claim 7, wherein determining the alternative order comprises selecting a set of modules to maximize cache utilization at the client.

11. The method of claim 7, further comprising:

receiving from the user data identifying the user-specified streaming order for the particular function.

12. A system for streaming a plurality of modules of an application from a streaming server computer to a client computer, the system comprising:

the streaming server computer coupled to the client computer via a network;

a streaming code module database having the plurality of modules stored therein, each of the plurality of modules including executable code; and a streaming control file database having predictive data stored therein, the predictive data comprising potential execution transitions between the plurality of modules and a weighted value associated with each of the potential execution transitions, each said weighted value indicating a likelihood relative to other transitions that the corresponding potential execution transition will occur when the application is executed;

wherein the streaming server computer is configured to receive an indication from the client computer that the application is in a given state, compute an order in which the modules should be sent to the client computer with reference to weighted values associated with module transitions for the application when in the given state, and stream the modules to the client computer in the computed order.

13. The system of claim 12, wherein:

the weighted value associated with each transition is further associated with a respective category; and the streaming server computer is further configured to select the weighted value for use during order computation in accordance with the respective category.

14. The system of claim 13, wherein the respective category comprises user age and time of usage.

15. The system of claim 12, wherein the streaming server computer is further configured to:

identify a sequence of module transitions having the same weighted transition values;

group the modules in the identified sequence of module transitions into a batch; and stream the grouped modules to the client computer in the batch.

16. The system of claim 12, wherein the streaming server computer is further to:

project client cache utilization in response to client computer receipt of particular sets of modules; and compute an order of module utilization by the application at the client computer with further reference to the client cache utilization projections.

17. The system of claim 12, wherein the streaming server computer is further configured to:

receive from a user a customized streaming order specifying at least one of a sequence of functions and a sequence of modules for a specified function; and compute an order of module utilization by the application at the client computer with further reference to the customized streaming order.

18. A machine-readable storage device containing executable instructions which, when executed by a processing system, cause the processing system to perform a method for streaming a plurality of modules of an application from a server to a client, the method comprising:

identifying potential execution transitions between the plurality of modules, each of the plurality of modules including executable code;

associating a weighted value with each transition, each said weighted value indicating a likelihood relative to other transitions that said transition will occur when the application is executed;

computing an order in which the plurality of modules is to be streamed to the client, based on a weighted value associated with each transition;

initiating transmission of the plurality of modules to the client in said order, to cause the client to execute executable code in at least a first module of the plurality of modules while at least a second module of the plurality of modules is being transmitted to the client; and deciding, during the transmission of the plurality of modules, whether said order in which the plurality of modules is to be streamed to the client is to be modified in response to receiving data pertaining to a current execution state of the application from the client.

19. The machine-readable storage device of claim 18, wherein the weighted value associated with each transition is further associated with a respective category, and weighted values used during the computation of the order are selected in accordance with the respective category.

20. The machine-readable storage device of claim 18, wherein deciding whether the computed order is to be modified comprises utilizing data identifying projected client cache utilization.

* * * * *

UNITED STATES PATENT AND TRADEMARK OFFICE
CERTIFICATE OF CORRECTION

| | | |
|---|---|---|
| PATENT NO. | : 7,606,924 B2 | Page 1 of 1 |
| APPLICATION NO. | : 10/354947 | |
| DATED | : October 20, 2009 | |
| INVENTOR(S) | : Raz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this

Twelfth Day of October, 2010

David J. Kappos
*Director of the United States Patent and Trademark Office*